United States Patent [19]

Magori

[11] Patent Number: 4,922,750
[45] Date of Patent: May 8, 1990

[54] ULTRASOUND PHASE DIFFERENCE METHOD FOR MEASURING HIGH FLOW RATES

[75] Inventor: Valentin Magori, Munich, Fed. Rep. of Germany

[73] Assignee: Siemens Aktiengesellschaft, Berlin and Munich, Fed. Rep. of Germany

[21] Appl. No.: 330,940

[22] Filed: Mar. 28, 1989

Related U.S. Application Data

[63] Continuation of Ser. No. 218,474, Jul. 6, 1988, abandoned, which is a continuation of Ser. No. 82,599, Aug. 7, 1987, abandoned.

[30] Foreign Application Priority Data

Sep. 30, 1986 [DE] Fed. Rep. of Germany ....... 3633187

[51] Int. Cl.$^5$ ............................................. G01M 15/00
[52] U.S. Cl. ................................ 73/118.2; 73/861.29
[58] Field of Search ............. 73/118.2, 861.02, 861.27, 73/861.28, 861.29, 861.31

[56] References Cited

U.S. PATENT DOCUMENTS 2,911,826 11/1959 Kritz ............................ 73/861.27 X
4,240,292 12/1980 Zalessky et al. ................. 73/861.27

Primary Examiner—Jerry W. Myracle
Attorney, Agent, or Firm—Hill, Van Santen, Steadman & Simpson

[57] ABSTRACT

A method for measuring high flow rates, particularly for the intake air for motor vehicle drives, includes the steps of modulating an oscillator signal, transmitting the modulated oscillator signal via two paths, with at least one of the paths passing through the flow path to be measured and the interacting with the fluid flow so that the signal in that path is phase-shifted by an amount dependent on the flow rate, separately receiving the signals from the two paths, comparing the received signals by phase discrimination to obtain a signal corresponding to the phase difference in the signals from the two paths, and deriving a signal corresponding to the flow rate from the phase difference. One or both of the signal paths can be an ultrasonic transmisson path. If the phase discrimination takes place in a phase discriminator which has an unstable range of operation, corrective steps can be taken so that the phase discrimination necessary for the method is moved out of the unstable range.

10 Claims, 5 Drawing Sheets

ULTRASOUND PHASE DIFFERENCE METHOD FOR MEASURING HIGH FLOW RATES

This is a continuation of application Ser. No. 218,474, filed 7/6/88, now abandoned, which is a continuation of application Ser. No. 082,599, filed 8/7/87, now abandoned.

BACKGROUND OF THE INVENTION

1. Field of the Invention

The present invention is directed to an ultrasound phase difference method for measuring high flow rates, particularly of the intake air for motor vehicle drives, by a measuring arrangement which is formed by two ultrasound measuring paths intersecting in the flow axis of a measuring tube. The measuring paths each defined between a transmission ultrasound transducer and a receiving ultrasound transducer, the ultrasound transducers being arranged in the wall of the measuring tube so that one of the measuring paths has its transmission ultrasound transducer upstream from its receiving ultrasound transducer and the other measuring path has its transmission ultrasound transducer downstream of its receiving ultrasound transducer. The measuring arrangement also includes an oscillator, at least one receiving amplifier and an evaluation device.

2. Description of the Prior Art

As is known in the art, the relation, $$\Delta\phi = 4\pi \cdot f \cdot L \cdot \frac{v}{c^2}$$

is valid for ultrasound flow rate meters based on the phase difference method, whereby $\Delta\phi$ is the measured phase difference, f is the operating frequency, l is the effective length of the measuring path, v is the effective flow rate and c is the speed of sound in the fluid.

It is desirable for achieving high measuring sensitivity to select the ratio $\Delta\phi/v$ as large as possible by a corresponding dimensioning of the measuring path. This, however, would cause the unambiguity range of the phase discriminator to be exceeded given high flow rates. The absolute phase difference is thus not measured; rather, an incremental $\Delta\phi'$ is measured which is obtained from the absolute phase difference by subtracting $2n\pi$ or $n\pi$ dependent on the type of phase discriminator employed), i.e.

$$\Delta\phi' = \Delta\phi - 2n.\pi$$

or $$\Delta\phi' = \Delta\phi - n.\pi$$

The whole-number factor n is generally unknown. Disturbing modes of the phase discriminator occur at the locations $\Delta\phi = 2n\pi$ (or $\Delta\phi = n\phi$).

Conventional measuring formats therefore had to be dimensioned such that the measured phase difference lies within the high precision range of the phase discriminator, even given maximum flow rate. This constitutes a restriction of the possibilities in the design of the measuring path and in the possible measuring sensitivity.

In particular, ultrasound flow rate measuring paths for the intake air of motor vehicle engines can only be dimensioned by selection of a low ultrasound frequency because of the high maximum flow-through rate ($v_{max} \approx 400$ m³/h, $\phi \approx 60$ mm) and of the low speed of sound in air. The utilization of low frequencies, however, causes problems due to, among other things, the high noise level at low frequencies.

SUMMARY OF THE INVENTION

The object of the present invention is to provide an ultrasound phase difference method for measuring high flow rates which eliminates the above-discussed problem inherent in the prior art in the simple manner.

The above object is achieved, according to the present invention in an ultrasound phase difference method for measuring high flow rates, particularly for the intake air for motor vehicle drives, by a measuring arrangement which is formed by two ultrasound measuring paths intersecting in the flow axis of the measuring tube. The measuring paths are each defined between a transmission ultrasound transducer and a receiving ultrasound transducer, the ultrasound transducers being arranged in the wall of the measuring tube with one of the measuring paths having its transmission ultrasound transducer upstream from its receiving ultrasound transducer and the other measuring path having its transmission ultrasound transducer downstream from its receiving ultrasound transducer, and the measuring arrangement also including an oscillator which drives the ultrasound transducers, at least one receiving amplifier, as well as an evaulation device. The method is particularly characterized in that the frequency of the oscillator is modulated with a modulator and, therefore, the frequency of the emitted ultrasound waves is indirectly modulated. A known difference in the phase relationship of the received signals which generated by the ultrasound receiving transducers occurs due to the modulation of the measuring arrangement. Deviations in the value of the known phase difference occur due to flow through the measuring tube, and thus through the measuring paths, which are represented by the output signal of a phase discriminator having inputs respectively connected to the outputs of the receiving transducers via two amplifiers. An evaluation device displays the flow rate based on the magnitude of the deviations.

BRIEF DESCRIPTION OF THE DRAWINGS

Other objects, features and advantages of the invention, its organization, construction and operation will be best understood from the following detailed description taken in conjunction with the accompanying drawings, on which.

DESCRIPTION OF THE PREFERRED EMBODIMENTS

Given frequency modulation of the ultrasound, the difference of the phases of the received signals is modulated. The steepness of the modulation characteristic $$\frac{a}{af}(\Delta\phi) = 4\pi \cdot L \cdot \frac{v}{c^2}$$

is proportional to the flow rate. This is true at high flow rates outside of the discontinuities of the phase discriminator, even for the incremental phase difference $$\frac{a}{af} = (\Delta\phi') = 4\pi \cdot l \cdot \frac{v}{c^2}$$

for $$\phi \neq 2n.\pi$$

or $$\phi \neq n.\pi$$

Figure 1:
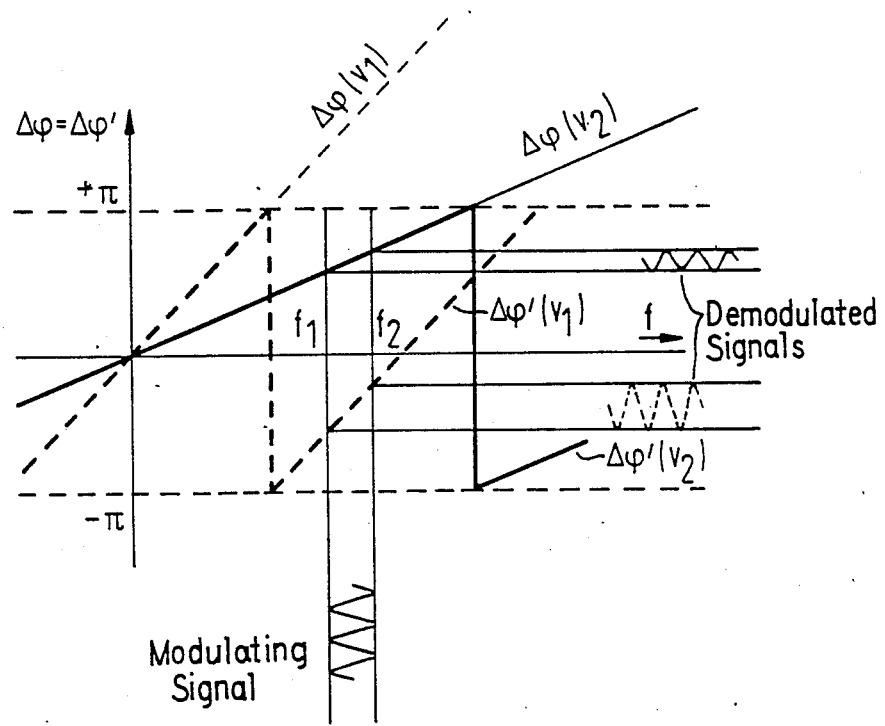
FIG. 1 is a diagrammatic illustration relating to the modulation of the phase difference by frequency modulation of the ultrasound with steepness of the modulation characteristic proportional to the flow rate.

As ac voltage component is therefore contained as a "demodulated signal" in the output signal of the phase discriminator given frequency modulation of the ultrasound, the amplitude of this "demodulated signal" being proportional to the flow rate, cf. FIG. 1.

Figure 2:
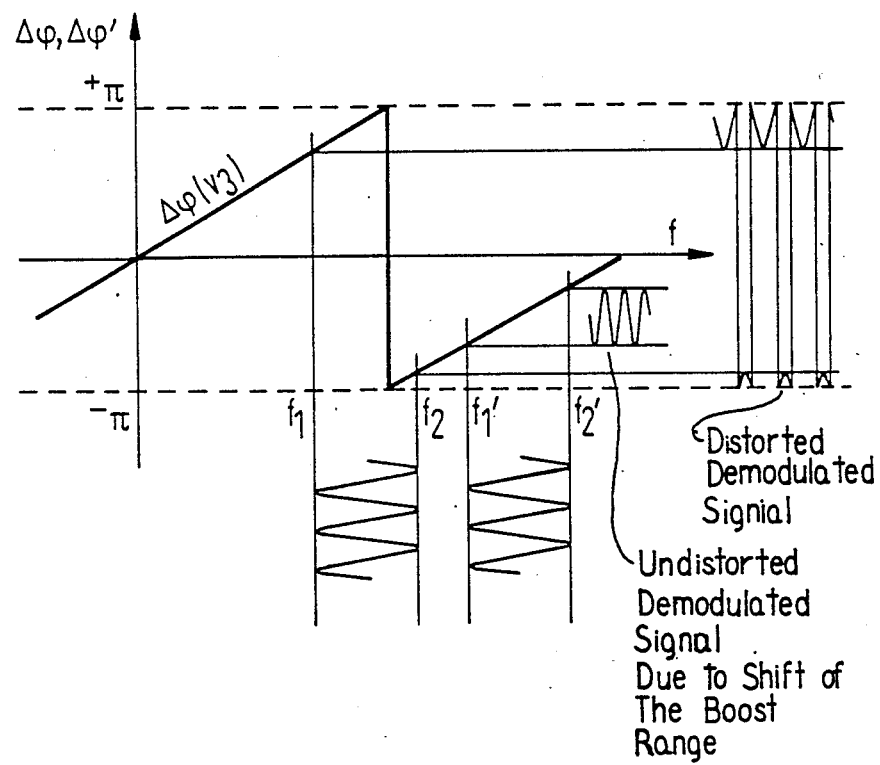
FIG. 2 is a diagrammatic illustration relating to the recognition of unsteadiness in the modulation characteristic.

If frequency range of the ultrasound signal falls on an unstable location of the phase discriminator (dependent on the effective flow rate v), cf. FIG. 2, this can be easily recognized on the basis of the distortions of the demodulated signal and can be eliminated by an automatic shift of the frequency range or by adding a phase shifter in one of the two transmission paths or in one of the two receiving paths. Since the required phase shift preferably amounts to $\pi$ or $\pi/2$, it can also be achieved by logical manipulations of the transmission signal at one of the two converters (for example, by frequency division with switching of the polarity of the oscillator signal to be divided, as disclosed in the German published application 26 13 375). The steepness of the modulation characteristic remains uninfluenced by these phase shifts.

Figure 3:
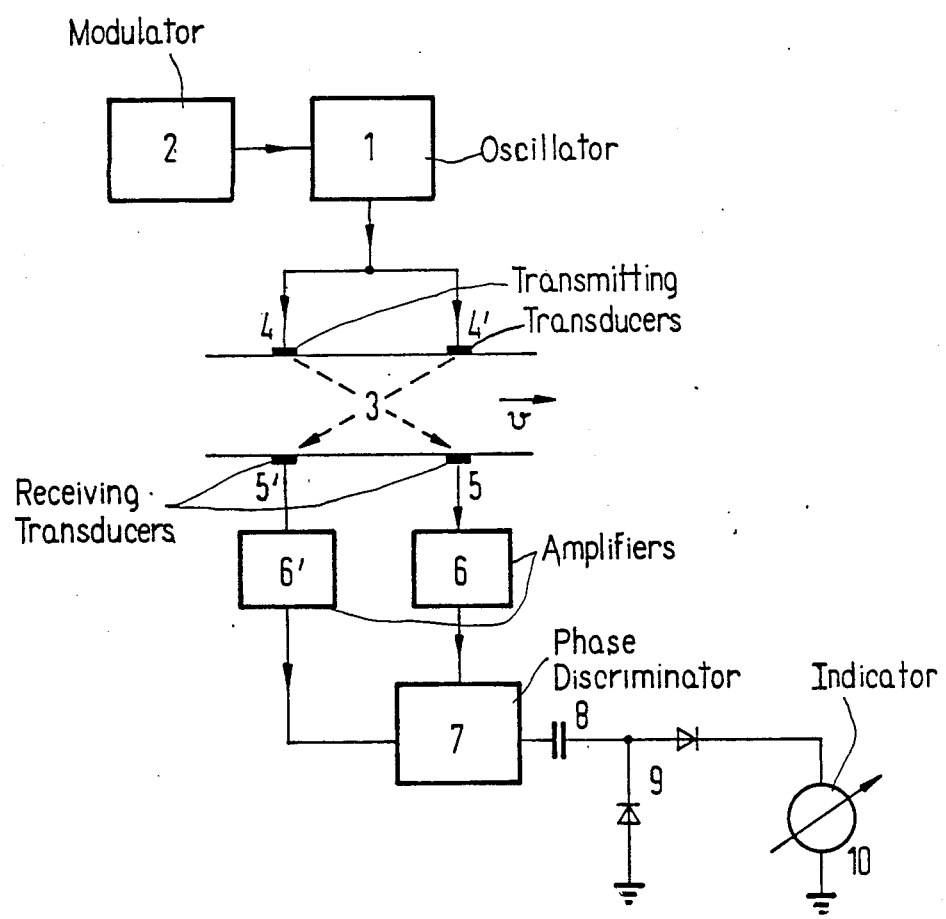
FIG. 3 is a block diagram and schematic illustration of a first exemplary embodiment of the invention for measuring arrangement for the implementation of the method of the invention.

Given lower accuracy requirements, it can definitely be adequate to evaluate only the amplitude of the demodulated signal, cf. the simple measuring arrangement of FIG. 3.

Figure 4:
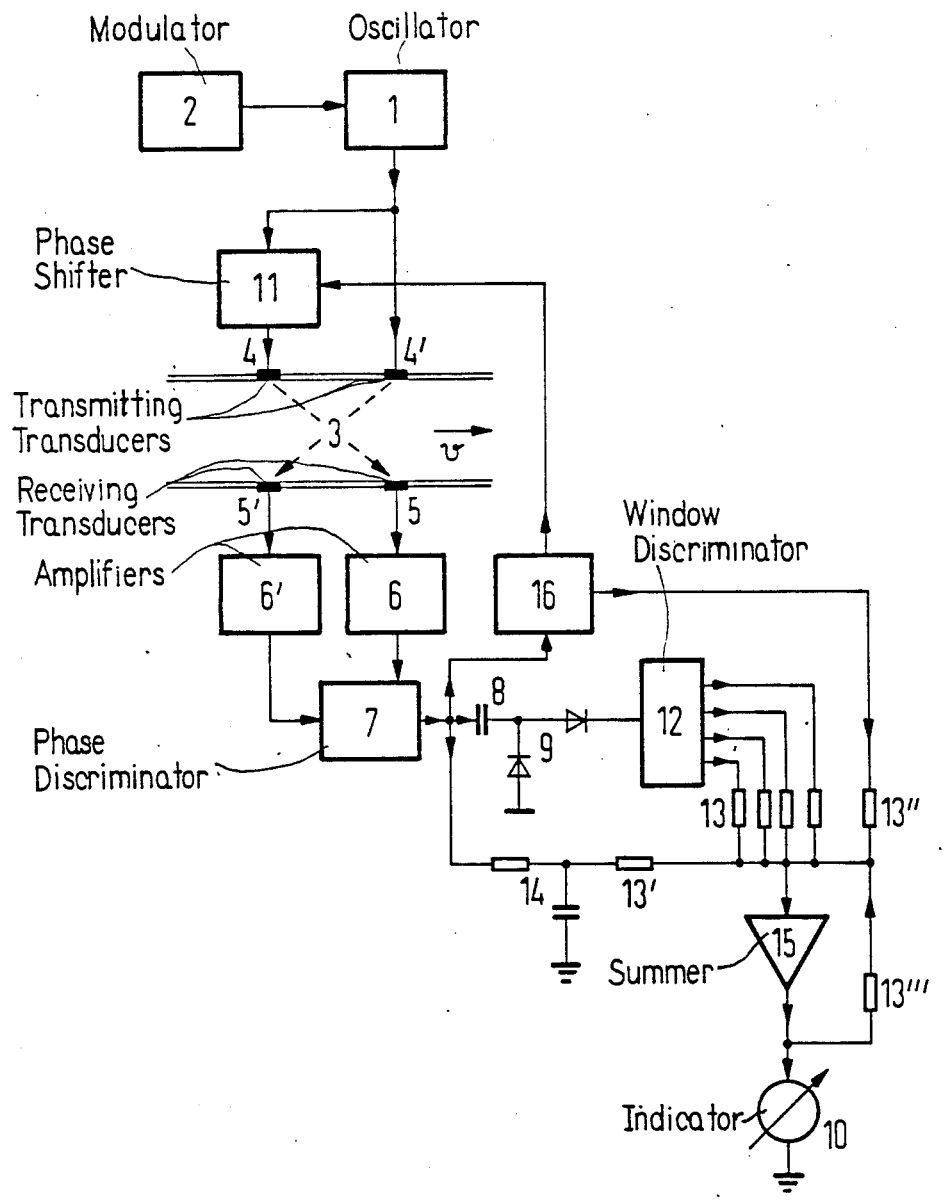
FIG. 4 is a block and schematic diagram of a second exemplary embodiment of the invention of a measuring arrangement with high resolution of the implementation of the method of the invention.

Given higher accuracy requirements, it is advantageous to combine the demodulated signal and the mean value of the output signal of the phase discriminator corresponding to the incremental phase difference, such that the overall phase derives therefrom with high precision, cf. the measuring arrangement of FIG. 4 having high resolution.

For simplifying the illustration, FIGS. 3 and 4 show measuring arrangements each including two transmission and receiving transducers. The described method, however, can also be implemented with two-transistor arrangements which "sound bursts" as is known for other purposes. In this case, the output signal of the phase discriminator which has appeared during reception must be intermediately stored, for example with a sample-and-hold element, and the modulation frequency must be selected lower than the burst repetition rate in accordance with the requirements of the sampling theorem.

Figure 5:
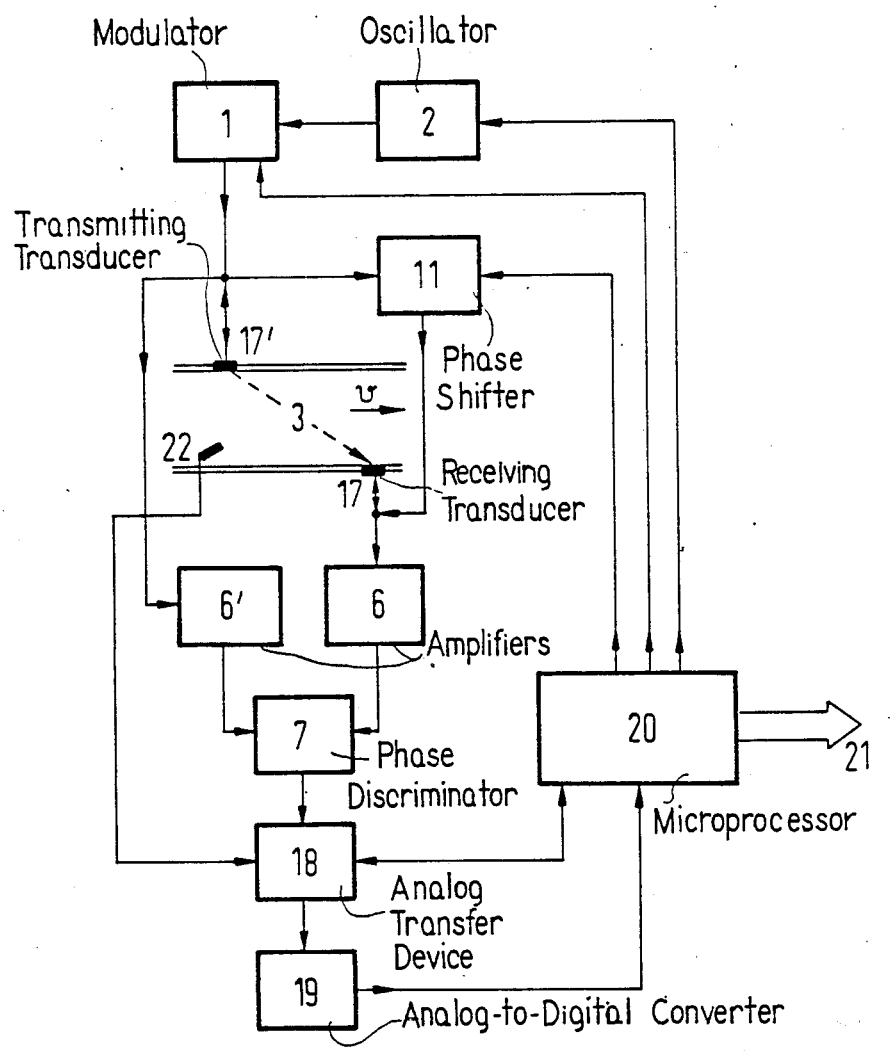
FIG. 5 is a block and schematic diagram of a third exemplary embodiment of the invention of a measuring instrument of the implementation of the method of the invention, whereby the measuring arrangement utilizes a microprocessor.

The output signal of the phase discriminator can alternatively be stored in a microprocessor after conversion with an analog-to-digital converter, cf. the measuring arrangement of FIG. 5. This enables the evaluation of the output signal of the phase discriminator in the sense set forth. Using a transfer device controlled by the microprocessor, it is also be possible to digitize other measured values present in analog form (for example, temperature) and to supply such values for evaluation. In addition, the control of the modulator of the required transmission/receiving transfer device, and of the designational phase shift, could be implemented by the microprocessor.

Referring now to FIG. 1, the demodulated signals are shown on the right with respect to the modulation of the phase difference by frequency with a modulating signal shown at the bottom of FIG. 1. The entire drawing relates to the modulation of the phase difference by frequency modulation of the ultrasound with the steepness of the modulation characteristic which is proportional to the flow rate.

In FIG. 2, the distorted modulated signal is illustrated at the right with the undistorted modulated signal provided by shifting the boost range. As mentioned, the distortion caused by an unstable location in the range of the phase discriminator can be easily recognized on the basis of distortions of the demodulated signal and can be eliminated by automatic shift of the frequency range, or by adding a phase shifter in one of the two transmission paths or in one of the two receiving paths.

Referring to FIG. 3, an FM modulatable oscillator 1 is illustrated as feeding a pair of transmitting transducers 4 and 4' which transmit respective ultrasound signals along measuring paths 3 between the transmitting transducers 4 and 4' and receiving transducers 5 and 5'.

The receiving transducer 5 is connected to a receiving amplifier 6 and the transducer 5' is connected to a receiving amplifier 6'. Each of the receiving amplifiers is then connected to a phase discriminator 7 which is connected, via a separating capacitor 8 and a rectifier 9, to an indicator 10. The elements 8 and 9 constitute a sample-and-hold circuit for the instrument or indicator 10.

In FIG. 4, the FM modulatable oscillator 1 is connected to a modulator 2 which modulates the output of the oscillator 1, which is directly supplied to the transmitting amplifier 4'. A switchable phase shifter 11 is provided between the oscillator 1 and the transmitting transducer 4. Again, the transmission paths 3 are established to the respective receiving transducers 5 and 5'. Also again, the receiving transducers 5 and 5' are respectively connected to receiving amplifiers 6 and 6' which, in turn, are connected to a phase discriminator 7. As in the circuit of FIG. 3, the phase discriminator 7 is connected to a separating capacitor 8 and a rectifier 9.

The rectifier 9 is connected to a window discriminator 12 which, in turn, is connected via a plurality of resistors 13 to the input of a summer 15 to form a mean value. The output of the summer 15 is connected to the indicator 10. There is a feedback circuit from the output of the summer 15 to the input thereof via a resistor 13".

There is also an input to the summer 15 a low pass filter 14 and a resistor 13' so that the output of the phase discriminator 7 is combined with the mean value.

If the phase discriminator 7 has a range of unstable operation, this will result in distortions of the output signal from the phase discriminator 7. This output signal can therefore additionally be suppled to an instability detector 16. As can be seen in FIG. 2, distorted signals, if they occur, will have a high peak value. The instability detector 16, which may consist of a high-pass filter, a level detector operating at a selected threshold, and a Schmitt trigger, generates an output signal if the peak of the output signal from the phase discriminator 7 exceeds the selected threshold, thereby indicating the presence of distortions and thus indicating the phase discriminator 7 is operating in an unstable range. The output signal from the instability detector 16 controls a phase shifter 11 connected between the output of the oscillator 1 and one of the transmitting transducers, such as the transmitting transducer 4, so that the signal transmitted by the transducer 4, and received by the transducer 5, exhibits a phase shift in an amount to take the operation of the phase discriminator 7 out of the unstable range.

Referring to FIG. 5, the FM modulatable oscillator is connected to the modulator 2, as before, and the oscillator 1 is connected to a transmitting transducer 17' which transmits ultrasound signals to a receiving transducer 17.

The oscillator 1, in this case, is connected directly to the receiving amplifier 6', while the receiving amplifier 6 is connected to the output of the transducer 17 and to the output of the switchable phase shifter 11 which is also fed by the oscillator 1.

The outputs of the amplifiers 6 and 6' are connected to the phase discriminator 7 which, in turn, is connected to an analog transfer device 18 which is adjusted by a temperature sensor 22. The analog transfer device is also controlled by the microprocessor 20.

The output of the analog transfer device 18 is connected to an analog-to-digital converter 19 which converts the analog data into digital data and stores the same in the microprocessor 20. The microprocessor 20 controls the settings of the switchable phase shifter 11, the frequency of the oscillator 1, and the modulator 1.

The microprocessor 20, for example, may undertake a logical manipulation of the incoming signals to eliminate the aforementioned distortions such as, for example, dividing the frequency and switching the polarity of the oscillator output signal.

The microprocessor 20 includes an output 21 at which the flow rate data are present.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A method for measuring the flow rate of a fluid flow in a flow path, comprising the steps of:
    modulating an oscillator signal to obtain a modulated oscillator output;
        transmitting said modulated oscillator output via two paths so that at least one of said paths passes through said flow path and said modulated oscillator output in said one path interacts with said fluid flow thereby phase-shifting said modulated oscillator output in said one path by an amount dependent on said flow rate;
    separately receiving said modulated oscillator output from each of said two paths;
    comparing the received modulated oscillator output from each of said two paths by phase discrimination to obtain a signal corresponding to the phase difference between said modulated oscillator output from said two paths; and
    deriving a signal corresponding to said flow rate from said signal corresponding to the phase difference.

2. A method as claimed in claim 1, wherein the step of transmitting said modulated oscillator output via two paths is further defined by the step of:
    driving first and second ultrasonic transmitting transducers with said modulated oscillator output so that each of said first and second transducers transmits an ultrasound signal preserving the modulation in said modulated oscillator output, and wherein the step of separately receiving said modulator oscillator output from each of said two paths is further defined by the steps of:
    receiving said ultrasound signal from said first ultrasound transmitting transducer with a first ultrasound receiving transducer disposed downstream, relative to said fluid flow, of said first ultrasound transmitting transducer, said first ultrasound transmitting transducer and said first ultrasound receiving transducer defining a first of said two paths therebetween; and
    receiving said ultrasound signal from said second ultrasound transmitting transducer with a second ultrasound receiving transducer disposed upstream, relative to said fluid flow, from said second ultrasound transmitting transducer, said second ultrasound transmitting transducer and said second receiving transducer defining a second of said two paths therebetween, said first and second paths intersecting.

3. A method as claimed in claim 1, wherein the step of transmitting said modulated oscillator output via two paths is further defined by the steps of:
    driving an ultrasound transmitting transducer with said modulated oscillator output to generate an ultrasound signal preserving the modulation in said modulated oscillator output and said ultrasound signal passing through said flow path abd defining a first of said two paths; and
    directly electrically transmitting said modulated oscillator output and defining a second of said two paths, and wherein the step of separately receiving said modulated oscillator output from each of said two paths includes the step of:
    receiving said ultrasound signal with an ultrasound receiving transducer.

4. A method as claimed in claim 1, wherein the step of comparing said modulated oscillator output from each of said two paths by phase discrimination is undertaken in a phase discriminator having an unstable range of operation which gives rise to a distorted output signal from said phase discriminator, comprising the additional steps of:
    detecting the occurrence of said distorted output signal of said phase discriminator; and
        phase shifting, if a distorted phase discriminator output signal is detected, the modulated oscillator output transmitted via one of said two paths by an amount to take the operation of said phase discriminator out of said unstable range.

5. A method as claimed in claim 1, wherein the step of deriving a signal corresponding to said flow rate is further defined by evaluating the amplitude of said signal corresponding to the phase difference.

6. A method as claimed in claim 1, wherein the step of deriving a signal corresponding to said flow rate is further defined by the steps of:
    forming a mean value from a plurality of said signals corresponding to the phase difference; and
    combining said mean value with a signal corresponding to said phase difference to form said signal corresponding to said flow rate.

7. A method as claimed in claim 1, wherein said signal corresponding to said phase difference is an analog signal, and wherein the step of deriving a signal corresponding to said flow rate comprises the steps of:
    supplying said signal corresponding to the phase difference to an analog-to-digital converter to obtain a digital signal corresponding to the phase difference; and
    supplying said digital signal corresponding to the phase difference to a microprocessor for signal evaluation.

8. A method as claimed in claim 7, comprising the additional steps of:
    detecting a selected characteristic of said fluid in said fluid flow; and
    supplying a signal corresponding to said selected characteristic to said microprocessor for use by said microprocessor in evaluating said digital signal corresponding to the phase difference.

9. A method as claimed in claim 8, wherein the step of detecting a selected characteristic is further defined by detecting the temperature of said fluid in said fluid flow.

10. A method as claimed in claim 7, comprising the additional step of:
    controlling said oscillator and the step of modulating said oscillator by said microprocessor based on said evaluation by said microprocessor of said digital signal corresponding to the phase difference.

* * * * *